US012641139B2

(12) United States Patent
Marie et al.

(10) Patent No.: US 12,641,139 B2
(45) Date of Patent: May 26, 2026

(54) METHOD AND DEVICE FOR MODIFYING A MULTIMEDIA CONTENT ACCORDING TO THE ATTENTION OF A USER

(71) Applicant: ORANGE, Issy-les-Moulineaux (FR)

(72) Inventors: Tiphaine Marie, Chatillon Cedex (FR); Maryline Gidon, Chatillon Cedex (FR); François Cardot, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 40 days.

(21) Appl. No.: 18/188,782

(22) Filed: Mar. 23, 2023

(65) Prior Publication Data

US 2023/0308498 A1    Sep. 28, 2023

(30) Foreign Application Priority Data

Mar. 25, 2022    (FR) ..................................... 2202683

(51) Int. Cl.
*H04L 65/75* (2022.01)
*G06F 11/34* (2006.01)

(52) U.S. Cl.
CPC ........ *H04L 65/762* (2022.05); *G06F 11/3438* (2013.01); *G06F 2201/86* (2013.01)

(58) Field of Classification Search
CPC .............. H04L 65/762; G06F 11/3438; G06F 2201/86; H04N 7/147
USPC ..................................................... 375/240.02
See application file for complete search history.

(56) References Cited

U.S. PATENT DOCUMENTS

| | | | | |
|---|---|---|---|---|
| 10,089,067 B1 * | 10/2018 | Abuelsaad | .............. | G10L 17/22 |
| 10,972,655 B1 * | 4/2021 | Ostap | ..................... | H04N 7/147 |
| 11,190,735 B1 * | 11/2021 | Trim | ...................... | G06V 20/52 |
| 11,563,916 B2 * | 1/2023 | Pell | ..................... | H04L 65/1089 |
| 12,328,530 B1 * | 6/2025 | Libin | ................. | H04L 12/1822 |
| 2005/0170856 A1 * | 8/2005 | Keyani | ................... | H04W 4/06 |
| | | | | 455/466 |
| 2014/0028785 A1 * | 1/2014 | Valentine | ............ | H04L 12/1822 |
| | | | | 348/E7.083 |
| 2014/0139609 A1 * | 5/2014 | Lu | ........................... | G06T 11/60 |
| | | | | 348/14.03 |
| 2014/0247319 A1 * | 9/2014 | Anderson | ........... | H04L 12/1827 |
| | | | | 348/14.08 |
| 2018/0331842 A1 * | 11/2018 | Faulkner | .................. | H04N 7/15 |
| 2021/0385886 A1 * | 12/2021 | Lo | ......................... | H04W 76/10 |
| 2022/0020388 A1 * | 1/2022 | Trim | ..................... | H04M 3/568 |

(Continued)

OTHER PUBLICATIONS

French Search Report and Written Opinion dated Nov. 9, 2022 for corresponding French Application No. 2202683, filed Mar. 25, 2022.

*Primary Examiner* — Tung T Vo
(74) *Attorney, Agent, or Firm* — David D. Brush; Westman, Champlin & Koehler, P.A.

(57) ABSTRACT

A method for modifying a multimedia content received by at least one first communication terminal from a second communication terminal. The method is implemented by a modification device and includes: obtaining at least one first datum representative of a multimedia sequence defined by a time frame of the multimedia content; obtaining at least one second datum representative of the activity of a user on the first terminal during the time frame; and modifying the multimedia content according to the result of the comparison of the first datum with the second datum.

15 Claims, 2 Drawing Sheets

(56)         References Cited

U.S. PATENT DOCUMENTS

Figure 1:
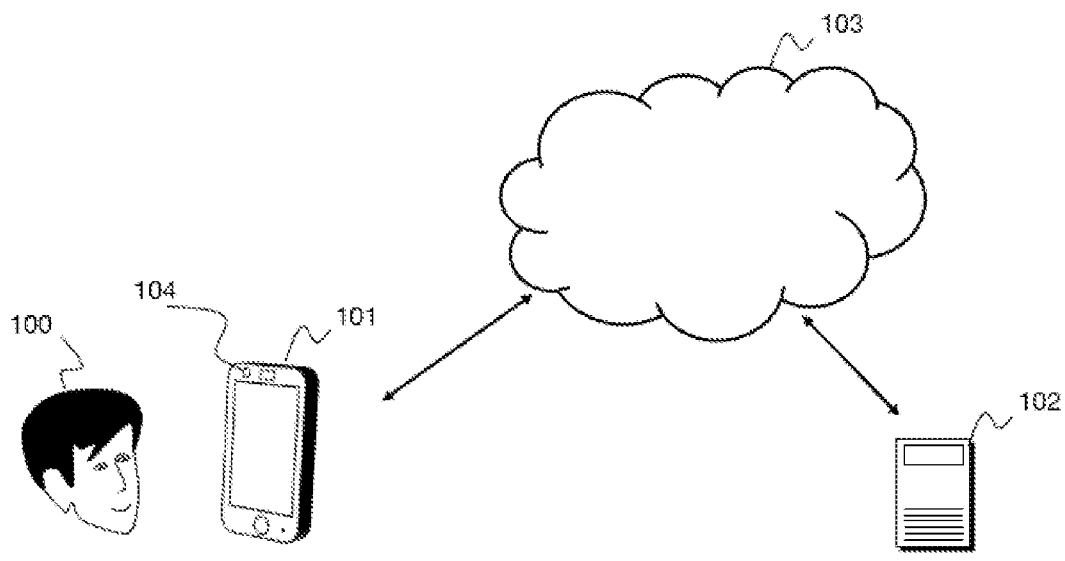

| | | | |
|---|---|---|---|
| 2022/0021551 A1* | 1/2022 | Trim | H04L 12/1818 |
| 2022/0076679 A1* | 3/2022 | Wu | G10L 15/22 |
| 2023/0351003 A1* | 11/2023 | Springer | H04L 65/403 |
| 2024/0411906 A1* | 12/2024 | White | G06N 20/00 |

* cited by examiner

METHOD AND DEVICE FOR MODIFYING A MULTIMEDIA CONTENT ACCORDING TO THE ATTENTION OF A USER

1. FIELD OF THE INVENTION

The invention relates to the field of telecommunications, and relates more particularly to telephonic and/or videophonic communications services.

2. PRIOR ART

The growth of communication technologies is these days accompanied by new usages. Connected terminals have become mainstream devices and these days occupy a central place in the life of their users, guiding them rapidly towards new usages. Their users can now be reached at any instant by a range of modalities and share all kinds of information with others, when and for as long as they want.

These terminals, and more particularly their communication software, are notably widely used in enterprise and allow increasingly immersive meetings (telephone and/or videophone) to be held remotely. For example, in these meetings, it is possible to share all kinds of information (documents, humour, interrogations, etc.) in addition to voice and/or video.

In these meetings, it is not rare for some non-active participants (that is to say participants not contributing to the main conversion) to deal with tasks or topics unconnected to the theme of the meeting at the same time. The participant then has a minimal level of attention and remains only on "standby" should he or she be named. However, whether the user is active or not, the level of information rendered by the communication tool/software remains the same.

It has to be accepted that there is no solution currently offered by the communication tools (document sharing, videoconference and other software) to automatically adapt this level of information according to the level of attention of the user.

3. SUMMARY OF THE INVENTION

The invention improves on the state of the art and to this end proposes a method for modifying a multimedia content received by at least one first communication terminal from a second communication terminal, said method being implemented by a modification device, and characterized in that the method comprises:

- a first step of obtaining at least one first datum representative of a multimedia sequence defined by a time frame of said multimedia content;
- a second step of obtaining at least one second datum representative of the activity of a user on said first terminal during said time frame;
- a step of modifying said multimedia content according to the result of the comparison of said first datum with said second datum.

Advantageously, the method makes it possible to automatically modify a multimedia content, for example a content displayed on the screen of a terminal by videoconference software, according to the degree of attention of the user. In concrete terms, the method obtains a first datum representative of the multimedia content broadcast/displayed during the videoconference and compares it to a second datum representative of the activity of the user. In the case where the comparison is negative, that is to say that the data do not match or do not form part of a same set (for example a same topic), the activity of the user can be considered to be unconnected to the themes/subjects of the meeting. That indicates that the user is paying little or no attention because he or she is focused on another subject. In this case, the multimedia content can be modified.

Multimedia content is understood to mean one or more audiovisual/multimedia/graphic elements (graphical interface, image, video, animation, clickable links, buttons, thumbnails, etc.) displayed by a display device (screen, video projector, etc.). The multimedia content can correspond to all or part of a set of audiovisual/multimedia elements generated/interpreted by an application (videoconference, document sharing, etc.) on a display device. The multimedia content can be an audio and/or video stream, a succession of small data files or else broadcast data received and/or currently being received.

"Activity of a user" is understood to mean all of the actions performed by the latter on a communication terminal and more particularly on his or her input/output devices (camera, keyboard, mouse, microphone, etc.) in order to produce a work/document (video, image, text, conversation via instant messaging, etc.).

A communication terminal is understood here to mean any device capable at least of rendering a multimedia content and of connecting to a communication network such as a computer, a smartphone, a connected television, a tablet, etc.

According to a particular implementation of the invention, a method as described above is characterized in that the modification step is followed by a step of provision of said modified multimedia content.

The provision can be done via the sending of the modified multimedia content (for example by streaming) to a device capable of rendering said modified multimedia content. The rendering device can be situated in the network, connected to or incorporated in the first terminal.

According to a particular implementation of the invention, a method as described above is characterized in that in that the first datum is obtained from a semantic analysis of the content of said multimedia sequence.

The semantic analysis of the multimedia sequence (shared documents, instant messaging, etc.) makes it possible to extract therefrom the predominant concepts/themes touched on in this sequence and thus generate a datum (for example one or more keywords) representative of this sequence. This analysis can be performed from:

- a text received and rendered in the multimedia sequence;
- a text obtained via an optical character recognition method (OCR, for "optical character recognition") executed on an image contained in the multimedia sequence;
- metadata associated with the content;
- the type of multimedia data.

According to a particular implementation of the invention, a method as described above is characterized in that said second datum is obtained from at least one software application run on said first terminal.

When the user uses software run on the terminal, it is possible to deduce therefrom his or her activity, that is to say the object/aims of his or her actions, of his or her work. For example, if the user drafts/reads a text document, it is possible to extract therefrom information in the form of keywords concerning subjects touched on in the document. These keywords are then compared to those obtained from the multimedia sequence, making it possible to deduce therefrom whether or not they belong to a same set (same theme). It is thus possible to determine if the user is drafting a report of the meeting in which he or she is participating by videoconference or if he or she is working on a file which is not related to the themes/objects/aims touched on during this same meeting.

Likewise, when a user produces a graphic work, for example the design of an object, it is possible, via an image recognition software application (artificial intelligence), to determine if the object concerned is discussed in the meeting (that is to say that the object belongs to the same set/topic as the keywords obtained from the multimedia sequence) and consequently if the work currently being produced by the user is related to the themes/objects/aims touched on during this same meeting.

The second datum can also be obtained from instant messaging software sued by the user. In addition to the keywords obtained from the conversion, the second datum can alternatively or cumulatively be the name of a participant or a list of names of participants in a conversion. In the case where the multimedia content is a videoconference, the names obtained from the messaging software can be compared to those of the participants to the videoconference (first datum). If the names do not match and/or have no hierarchical/social link (membership of a different entity, attachment to a different manager, different job title, etc.), that then gives an indication as to the fact that the user is working on a file which is perhaps not related to the themes/objects/aims touched on in the videoconference.

The second datum can also be obtained via the type of application used (music, text processing or other such application).

Alternatively or cumulatively, the second datum can be obtained from software of a third terminal of the user connected or not to said first terminal.

According to a particular implementation of the invention, a method as described above is characterized in that the modification step comprises a step of transmission of a request for modification of said multimedia content to said second terminal.

This embodiment makes it possible to notify the terminal transmitting the multimedia content that it must modify the multimedia content broadcast. The modification can for example correspond to a reduction of the encoding quality, elimination of an element (audio and/or video component) or to a rearrangement of the multimedia content transmitted.

According to a particular implementation of the invention, a method as described above is characterized in that the modification step comprises a step of changing of at least one parameter of said first terminal.

This embodiment makes it possible for example to modify "system" parameters of the terminal such as the brightness and/or the resolution of a display device (screen, video projector, etc.), the sound volume or else the focus/orientation of an associated/integrated camera.

According to a particular implementation of the invention, a method as described above is characterized in that the modification step comprises a step of changing of at least one parameter of computing software rendering said multimedia content, said software being run on said first terminal.

This embodiment makes it possible to modify the decoding/encoding quality, to eliminate an element (audio and/or video component) or to perform a rearrangement of the multimedia content received by the first terminal.

According to a particular implementation of the invention, a method as described above is characterized in that the modification step is followed by a second modification step, the reverse of the first, triggered by recognition of at least one keyword in an audio component of the multimedia content.

This embodiment makes it possible to revert to the initial state, when for example the name or the first name of the user is pronounced by one of the participants to the meeting/video-conference.

According to a particular implementation of the invention, a method as described above is characterized in that it is executed at regular intervals.

This embodiment makes it possible for example to modify the multimedia content and to revert to the initial state when the user is once again attentive. Specifically, on a first iteration the method can modify the multimedia content after having confirmed that the first and the second data do not correspond (user not attentive) and then on a second iteration perform the reverse modification when the first and the second data correspond (user attentive).

Alternatively, the method can be triggered following the reception of an event (software and/or hardware). The event can for example be triggered by the user (activation of the microphone and/or of the camera, reading and/or responding to a message received via the videoconference software, etc.).

The invention relates also to a device for modifying a multimedia content received by at least one first communication terminal from a second communication terminal, characterized in that the device comprises:

a first module for obtaining at least one first datum representative of a multimedia sequence defined by a time frame of said multimedia content;

a second module for obtaining at least one second datum representative of the activity of a user on said first terminal during said time frame;

a module for modifying said multimedia content according to the result of the comparison of said first datum with said second datum.

The term module can correspond equally to a software component and a hardware component or a set of hardware and software components, a software component itself corresponding to one or more computer programs or subprograms or, more generally, to any element of a program capable of implementing a function or a set of functions as described for the module concerned. Likewise, a hardware component corresponds to any element of a hardware set capable of implementing a function or a set of functions for the module concerned (integrated circuit, chipcard, memory card, etc.).

The invention relates also to a computer program comprising instructions for implementing the above method according to any one of the particular embodiments described previously, when said program is run by a processor. The method can be implemented in various ways, notably in hard wired form or in software form. This program can use any programming language, and be in the form of source code, object code, or of intermediate code between source code and object code, as in a partially compiled form, or in any other desirable form.

The invention also targets a computer-readable storage medium or information medium, comprising instructions for a computer program as mentioned above. The storage media mentioned above can be any entity or device capable of storing the program. For example, the medium can comprise a storage mean, such as a ROM, for example a CD ROM or a microelectronic circuit ROM, or even a magnetic storage means, for example a hard disc.

Also, the storage media can correspond to a transmissible medium such as an electrical or optical signal, which can be routed via an electrical or optical cable, wirelessly or by other means. The programs according to the invention can in particular be downloaded over a network of Internet type.

Alternatively, the storage media can correspond to an integrated circuit in which the program is incorporated, the circuit being adapted to execute or to be used in the execution of the method concerned.

This device and this system for modifying a multimedia content and this computer program offer features and advantages similar to those described previously in relation to the method for modifying a multimedia content.

4. LIST OF THE FIGURES

Figure 2:
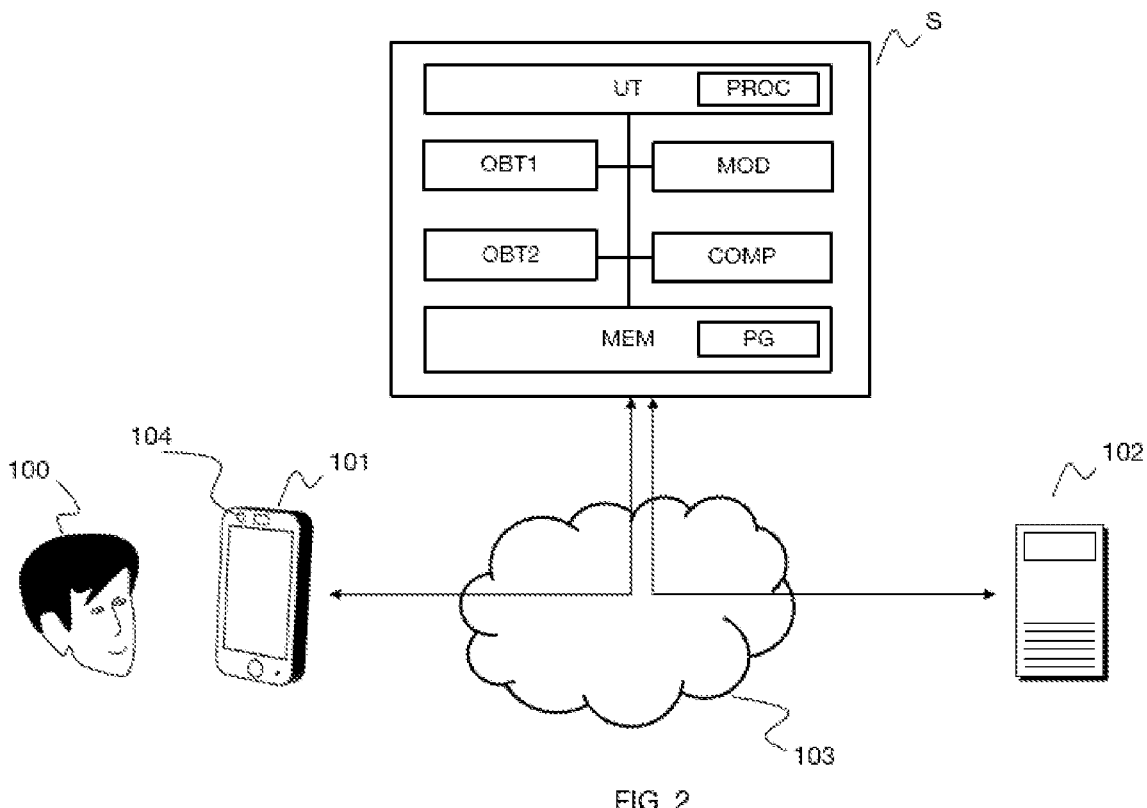
Figure 3:
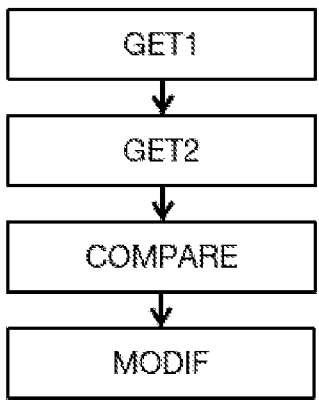

Other features and advantages of the invention will become more clearly apparent on reading the following description of particular embodiments, given as simple illustrative and nonlimiting examples, and the attached drawings, in which:

FIG. 1 illustrates an example of environment of implementation of the invention according to a particular embodiment of the invention, FIG. 2 illustrates the architecture of a device suitable for implementing the method for modifying a multimedia content, according to a particular embodiment of the invention, FIG. 3 illustrates the main steps of the method for modifying a multimedia content according to a particular embodiment of the invention.

5. DESCRIPTION OF AN EMBODIMENT OF THE INVENTION

FIG. 1 illustrates an example of environment of implementation of the invention according to a particular embodiment. The environment represented in FIG. 1 comprises at least one first terminal 101 which incorporates a device for modifying a multimedia content capable of implementing the method for modifying a multimedia content according to the present invention.

The method can operate permanently and autonomously as soon as it is activated or else following a user action.

According to other embodiments, the device for modifying a multimedia content can be situated in the network and/or distributed over one or more computing machines such as computers, terminals or servers.

The environment of implementation further comprises at least one second terminal 102.

The terminals 101 and 102 are suitable for establishing audio and/or video communications according to the state of the art by virtue of a communication network (103).

The environment of implementation can also comprise at least one camera (104), a microphone, a loudspeaker that is incorporated in or connected to the first terminal (101).

The terminal 101 is for example a terminal of smartphone, tablet, connected television, connected object, autonomous car, personal computer type or any other terminal capable of establishing a communication through a communication network. The terminal 101 is also able to render a multimedia content visually and/or vocally.

The terminal 102 can be a multimedia server capable of managing audio and/or video communications such as a telephone bridge or a videoconference server. Alternatively, the terminal 102 can be of the same kind as the terminal 101.

The environment represented in FIG. 1 also comprises a user 100 who can interact with the terminal 101.

FIG. 2 illustrates a device (S) configured to implement the method for modifying a multimedia content according to a particular embodiment of the invention. The device (S) has a conventional computer architecture, and comprises in particular a memory MEM, a processing unit UT, equipped for example with a processor PROC, and driven by the computer program PG stored in memory MEM. The computer program PG comprises instructions for implementing the steps of the method for modifying a multimedia content as described subsequently in support of FIG. 3, when the program is run by the processor PROC.

On initialization, the code instructions of the computer program PG are for example loaded into a memory before being executed by the processor PROC. The processor PROC of the processing unit UT notably implements the steps of the method for modifying a multimedia content according to any one of the particular embodiments described in relation to FIG. 3 and according to the instructions of the computer program PG.

The device (S) further comprises a first obtaining module OBT1 capable of obtaining at least one first datum representative of a multimedia sequence defined by a time frame of a multimedia content. The multimedia content is for example received from the terminal 102 via a communication module (not represented) configured to establish communications, for example of IP type, with the network 103.

The device (S) also comprises a second obtaining module OBT2 capable of obtaining at least one second datum representative of the activity of a user on the terminal 101 during a time frame.

The device (S) further comprises a module COMP capable of comparing the first and the second data in order to deduce therefrom the level of attention of the user 101.

The device (S) also comprises a module for modifying a multimedia content (MOD) capable of processing and of modifying a multimedia content. This module will for example modify the multimedia content received and/or currently being received by the device from the terminal 102. The modification can correspond to a modification of the decoding/encoding quality, to an elimination of at least one element (audio and/or video component) or to a modification of the arrangement of the multimedia content received.

Once modified, the multimedia content is then rendered to the user graphically via a display device (not represented) and/or vocally via a loudspeaker (not represented) situated on the device or connected to it.

FIG. 3 illustrates steps of the method for modifying a multimedia content according to a particular embodiment of the invention. In this example the method is executed on the terminal 101 of the user 100.

In the first step (GET1) the method obtains a first datum representative of a sequence of a multimedia content received from the terminal 102 (videoconference server). The multimedia sequence is a subset of the multimedia content defined by a time frame. For example, the multimedia sequence can correspond to the last 2 minutes of the multimedia content received by the terminal 101. The multimedia content comprises, for example, an audio/video stream of a videoconference, graphic elements and/or text. The audio/video stream can be composed of a plurality of video components represented in the form of video thumbnails. Each thumbnail corresponding to a video stream captured by a camera associated with a terminal of a participant to the videoconference.

This first datum can be obtained via a semantic analysis of a text (title of the videoconference, documents shared, list of participants, instant messages, etc.) contained in the multimedia sequence. It should be noted that the text can be received by the terminal 101 in the form of one or more character strings and directly form the subject of the semantic analysis or else be generated from an image (for example one or more screen captures of all or part of the multimedia sequence) using a character recognition method. This analysis then makes it possible to extract one or more keywords (first datum within the meaning of the invention) representative of the multimedia sequence.

The keywords are for example obtained/chosen according to their numbers of occurrence. The semantic analysis can also group together the keywords by theme/category and search for synonyms. The semantic analysis of a text is known per se and will not be described in more detail here.

The keywords can also comprise all of the words of a text. Such is for the example the case for the list of the names/first names of the participants to the videoconference.

Alternatively or cumulatively, the first datum can be the designation of an object obtained via a process of image recognition on an image contained in the multimedia sequence and displayed on a display device of the terminal 101 or else keywords obtained from an audio component of the multimedia sequence.

In the second step (GET2) the method obtains a second datum representative of the activity of the user 100 on the first terminal 101 during the time frame of the multimedia sequence.

This second datum can be obtained via one or more software applications run on the terminal 101. The software applications are for example communication (instant messaging, email, etc.), text, image, video processing software applications or else the operating system of the terminal 101.

Physically, by scanning the actions of the user on the terminal 101, it is possible to deduce therefrom his or her activity and, more specifically, the object/aims of his or her interactions with the terminal 101.

For example, when the user 100 drafts/reads a text document, it is possible to extract therefrom, via software (or a software probe) capable of performing a semantic analysis of the text, keywords representative of the subjects touched on in the document. These keywords correspond to the second datum within the meaning of the invention. The keywords are for example obtained/chosen according to their numbers of occurrence. The semantic analysis can further group together the keywords by theme/category and search for synonyms.

Another example, when a user produces a graphic work, for example the design of an object, it is possible, via an image recognition software application (artificial intelligence), to determine the designation of the object. This designation (keyword) corresponds to the second datum within the meaning of the invention.

More broadly, the second datum can be a title, a comment, metadata of an electronic document obtained from software capable of editing the document, a list of participants to a conversation obtained from instant messaging software, the name of an active/selected folder supplied by the operating system or any other information linked to an interaction performed by the user on the terminal 101.

It should be noted that these embodiments can be alternatives or cumulative.

The second datum can further correspond to keywords obtained from an audio component for example captured by a microphone associated with/incorporated in the terminal 101 or else included in a second terminal of the user. Such is for example the case when the user, in parallel with the meeting/videoconference, telephones a third party. The conversation can then be processed in order to extract keywords therefrom.

In the COMPARE step, the method compares the first datum with the second. That makes it possible to determine if the actions performed by the user on the terminal 101 are related to the themes/objects/aims touched on in the videoconference.

For example, when the user drafts/reads a text document, the keywords obtained via the semantic analysis of the multimedia sequence are compared to those obtained from the text document. When the keywords belong to one and the same set (same theme), the method considers that the work performed by the user on the terminal 101 is linked with the object discussed during the videoconference (reading documents discussed or drafting a report of the meeting). Otherwise, the method considers that the activity of the user is not linked with the object discussed during the videoconference.

Likewise, when a user produces a graphic work, for example the design of an object, it is possible, via image recognition software (artificial intelligence), to determine if the object concerned is discussed in the meeting (that is to say that the designation of the object belongs to the same set/topic as the keywords obtained from the multimedia sequence). If such is the case, the method considers that the work currently being produced by the user is related to the themes/objects/aims touched on in the meeting. Otherwise, the method considers that the activity of the user is not linked with the object discussed during the videoconference and that the multimedia content can be modified.

In another example, the method can compare the name of a participant or a list of names of participants to a conversion conducted via instant messaging software to the names of the participants to the videoconference. In the case where the names obtained from the messaging software correspond partly or totally to those of the participants to the videoconference, the method can consider that the user interacts with people linked with the videoconference and therefore produces work related to the themes/objects/aims touched on in the videoconference.

In the MODIF step, the method modifies or requests the modification of the multimedia content when, for example, it is determined that the activity of the user is not linked with the object discussed during the videoconference.

According to a particular embodiment of the invention, the modification or modifications made to the multimedia content are performed on the terminal 101. Physically, the method can modify the quality of the decoding, eliminate an element (audio and/or video component) or rearrange the multimedia content received from the terminal 102. These modifications can be performed by the method itself or else via the transmission, to a device and/or computing software, of a request requesting to modify the multimedia content. For example, the method can transmit, to the videoconference software used by the user 100, a request requesting the modification of the display of the multimedia content rendered on the terminal 101.

The modification can take the form of a partial or total reduction of the size of a window of the videoconference software, said window making it possible to render all or part of the multimedia content. This embodiment makes it possible to optimize the workspace of the user (for example the virtual office of a computer). Thus, the user will have more space to perform his or her tasks via other computer software.

The modification can also correspond to the elimination of graphic and/or video components of the multimedia content. For example, one or more thumbnails/video components can be eliminated. Indeed, it may be advantageous to retain only the audio part of the video-conference, given that the attention of the user is focused on another task. This embodiment makes it possible to reduce the computing resources used by the terminal 101 (for example the load of the processor and/or of the memory) according to the activity of the user. According to a particular embodiment of the invention, the method can reduce the sound volume of the videoconference via, for example, the parameters of the operating system of the terminal 101 or else via a request transmitted to the videoconference software run on the terminal 101. This embodiment allows the user to concentrate more easily on his or her current tasks.

According to a particular embodiment of the invention, the method can wholly or partly reduce the brightness of a display device of the terminal 101 via parameters of the operating system of the terminal 101. This embodiment makes it possible to reduce the energy consumption of the display device of the terminal 101.

According to a particular embodiment of the invention, the method can modify the display theme of the videoconference software run on the terminal 101. This embodiment for example allows the videoconference software to switch to a black and white theme and consequently reduce the energy consumption of the terminal 101.

According to a particular embodiment of the invention, the method can modify the decoding quality of one or more audio and/or video components of the multimedia content. This modification can be performed via a request transmitted to software primitives of the operating system (for example a driver of a digital signal processor) or of the videoconference software. This embodiment makes it possible to reduce the energy consumption and the computing resources (processor load, memory, etc.) used by the terminal 101.

According to a particular embodiment of the invention, the method can cut the acquisition of the video stream from the camera (104). This embodiment makes it possible to eliminate a video component of the multimedia content, that is to say the video component/thumbnail making it possible to render the video of the user 100 and of his or her environment. That makes it possible to reduce the energy consumption (ecological impact) and the computing resources (processor load, memory, etc.) used by the terminal 101. That also allows the user 100 to be no longer visible to the other participants while performing tasks unconnected to the meeting/videoconference. It should be noted that the method can replace the video stream from the camera 104 with the last image acquired of the user 100.

According to a particular embodiment of the invention, the method can modify the focus and/or the orientation of the camera 104. This embodiment makes it possible to modify the video component/thumbnail of the user 100 and of his or her environment. Thus, the user 100 can no longer be visible to the other participants while performing tasks unconnected to the meeting/videoconference.

According to a particular embodiment of the invention, the method can cut the audio acquisition from the microphone of the terminal 101. That makes it possible to observe a certain confidentiality while the user performs tasks unconnected to the meeting/videoconference.

According to a particular embodiment of the invention, the method is included in video-conference software run on the terminal 101.

According to a particular embodiment of the invention, the modification or modifications made to the multimedia content are performed in the network, for example on the terminal 102. The method then transmits a request requesting modification to the videoconference server (terminal 102). The modification or modifications can for example take the form of a modification of an element (audio and/or video component), of an elimination of an element (audio and/or video component) and/or of a rearrangement of the multimedia content transmitted.

Physically, when the method considers that the user is not attentive to the videoconference (that is to say that his or her activity is not linked with the subject/object of the meeting/videoconference), the method can transmit, to the videoconference server (terminal 102), a request requesting that the video component obtained from the camera 104 be eliminated from the multimedia content. Thus, the user 100 is no longer visible to the other participants while performing tasks unconnected to the meeting/videoconference.

Alternatively, the method can transmit, to the videoconference server (terminal 102), a request requesting that the multimedia content be rearranged. For example, the method can request that the video thumbnail/component obtained from the camera 104 be displayed at the end of the list of the thumbnails which makes up the audio/video stream of the video conference.

Alternatively or cumulatively, the method can ask the terminal 102 to eliminate the audio component acquired by the microphone of the terminal 101. Thus, the user 100 is no longer audible to the other participants while performing tasks unconnected to the meeting/video-conference.

Alternatively or cumulatively, the method can ask the terminal 102 for the video thumbnail/component and the audio component obtained respectively from the camera 104 and from the microphone of the terminal 101 to be modified via a particular computer processing operation. These modifications can correspond to a fuzzying of the video or to a degradation of the audio/video quality via the modification of the decoding/encoding method.

According to a particular embodiment of the invention, the modifications made in the MODIF step can be cancelled when a keyword is recognized in an audio component of the audio/video stream of the videoconference. This embodiment makes it possible to revert to the initial state, when the name or the first name of the user 100 is pronounced by one of the participants to the meeting/videoconference.

It should be noted that when the method is executed once again and the user is once again attentive, the method can modify the multimedia content in order to revert to the initial state.

It goes without saying that the embodiment which has been described above has been given in a purely indicative and nonlimiting manner, and that many modifications can easily be made by the person skilled in the art without in any way departing from the scope of the invention.

The invention claimed is:

1. A method for modifying a multimedia content received by at least one first communication terminal from a second communication terminal during a videoconference session, said method being implemented by a modification device and comprising:

a first act of obtaining at least one first datum representative of a multimedia sequence defined by a time frame of said multimedia content;

a second act of obtaining at least one second datum representative of a content used or produced by a user on said first terminal during said time frame via an application other than the one used for the multimedia content, said content not being shared during said videoconference session; and an act of modifying said multimedia content according to a result of a comparison of said first datum with said second datum.

2. The method according to claim 1, wherein the modification act is followed by an act of provision of said modified multimedia content.

3. The method according to claim 1, wherein the first datum is obtained from a semantic analysis of the content of said multimedia sequence.

4. The method according to claim 1, wherein the application is run on said first terminal.

5. The method according to claim 1, wherein the modification act comprises transmitting a request to modify said multimedia content to said second terminal.

6. The method according to claim 1, wherein the modification act comprises changing at least one parameter of said first terminal.

7. The method according to claim 1, wherein the modification act comprises changing at least one parameter of a computer software rendering said multimedia content, said software being run on said first terminal.

8. The method according to claim 1, wherein the modification act is a first modification and is followed by a second modification act, which is a reverse of the first modification act, triggered by recognition of at least one keyword in an audio component of the multimedia content.

9. The method according to claim 1, comprising executing the method at regular intervals.

10. The method according to claim 1, wherein the application other than the one used for the multimedia content is selected from the group consisting of an instant messaging application, an email application, a text processing software application, an operating system of the first terminal, and a document editing software application.

11. A device for modifying a multimedia content received by at least one first communication terminal from a second communication terminal during a videoconference session, wherein the device comprises:

a processor; and a non-transitory computer readable medium comprising instructions stored thereon which when executed by the processor configure the device to:

obtain at least one first datum representative of a multimedia sequence defined by a time frame of said multimedia content;

obtain at least one second datum representative of a content used or produced by a user on said first terminal during said time frame via an application other than the one used for the multimedia content, said content not being shared during said videoconference session; and modify said multimedia content according to a result of a comparison of said first datum with said second datum.

12. A terminal comprising the device for modifying a multimedia content according to claim 11.

13. The device according to claim 11, wherein the application other than the one used for the multimedia content is selected from the group consisting of an instant messaging application, an email application, a text processing software application, an operating system of the first terminal, and a document editing software application.

14. A non-transitory computer readable medium instructions for implementing a method for modifying a multimedia content received by at least one first communication terminal from a second communication terminal during a videoconference session, when the program is run by a processor of a modification device, said method comprising:

a first act of obtaining at least one first datum representative of a multimedia sequence defined by a time frame of said multimedia content;

a second act of obtaining at least one second datum representative of a content used or produced by a user on said first terminal during said time frame via an application other than the one used for the multimedia content, said content not being shared during said videoconference session; and an act of modifying said multimedia content according to a result of a comparison of said first datum with said second datum.

15. The non-transitory computer readable medium instructions according to claim 14, wherein the application other than the one used for the multimedia content is selected from the group consisting of an instant messaging application, an email application, a text processing software application, an operating system of the first terminal, and a document editing software application.

* * * * *